US006484211B2

(12) United States Patent
Turunen

(10) Patent No.: US 6,484,211 B2
(45) Date of Patent: *Nov. 19, 2002

(54) MOBILE INTERNET PROTOCOL FOR MOBILITY OF ACCESS HOSTS BETWEEN NETWORKS

(75) Inventor: Matti Turunen, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,106

(22) Filed: Dec. 10, 1998

(65) Prior Publication Data

US 2002/0143990 A1 Oct. 3, 2002

(30) Foreign Application Priority Data

Dec. 18, 1997 (FI) .................................................. 974557

(51) Int. Cl.[7] .............................................. G06F 15/16
(52) U.S. Cl. ........................ 709/245; 709/202; 709/228; 709/238; 709/239; 709/317
(58) Field of Search ................................ 709/220, 228, 709/238, 239, 245, 202, 317

(56) References Cited

U.S. PATENT DOCUMENTS

| 5,325,362 A | | 6/1994 | Aziz .......................... 370/94.3 |
| 5,442,633 A | * | 8/1995 | Perkins et al. ............... 370/331 |
| 5,845,079 A | * | 12/1998 | Wada et al. .................. 709/223 |
| 5,862,345 A | * | 1/1999 | Okanoue et al. ............. 709/238 |
| 5,968,123 A | * | 10/1999 | Fujiwara et al. ............. 709/223 |
| 6,219,715 B1 | * | 4/2001 | Ohno et al. .................. 709/245 |

FOREIGN PATENT DOCUMENTS

| EP | 0 812 086 A2 | 12/1997 |
| WO | WO 97/04611 | 2/1997 |

OTHER PUBLICATIONS

"Migration Support for Indirect Transport Protocols" Fieger et al., 1997 IEEE, XP–000764773, pp. 898–902.
"A Mobile Host Protocol Supporting Route Optimization and Authentication", Myles et al., IEEE Journal on Selected Areas in Communications vol. 13, No. 5, Jun. 1995, pp. 839–849.
"Mobile–IP, Ad–Hoc Networking, and Nomadicity", C. E. Perkins, 1996 IEEE, XP 000684381, pp. 472–476.

* cited by examiner

*Primary Examiner*—Saleh Najjar
(74) *Attorney, Agent, or Firm*—Perman & Green, LLP

(57) ABSTRACT

A method of enabling roaming of a mobile internet-access terminal from a first to a second internet access network each of which has a home agent for routing internet datagrams between networks. The method comprises de-registering the mobile terminal from said first network and registering it with said second network and allocating to the mobile terminal a new internet address in said second network. This new internet address is transmitted to the first network's home agent which registers that address as a care-of-address or co-located care-of-address for the mobile host. Datagrams addressed to the new internet address are sent directly to the mobile host via the second network's home agent. Datagrams addressed to a previous internet address of the mobile terminal in said first network are forwarded from that network's home agent to the mobile host, via the second network's home agent.

14 Claims, 2 Drawing Sheets

MOBILE INTERNET PROTOCOL FOR MOBILITY OF ACCESS HOSTS BETWEEN NETWORKS

FIELD OF THE INVENTION

The present invention relates to mobile internet protocol and in particular to a mobile internet protocol which provides for the mobility of mobile internet access hosts between two or more internet access networks.

BACKGROUND OF THE INVENTION

Corporate users have traditionally accessed the internet from a fixed location within a Local Area Network (LAN), a user's LAN often being referred to as his "home" network (HN). The user interface to the internet is typically a personal computer (the "host"). As is illustrated in FIG. 1, the home network is connected to an internet service provider which routes internet data, so-called "datagrams", between the home network and the internet, the internet in turn comprising other routers and service providers which route data to and from other "foreign" networks (FN).

In order to be able to transmit and receive datagrams to and from the internet, a host requires an internet address. A corporate home network is typically allocated a set of internet addresses by a national authority and the home network can assign these either fixedly or dynamically to hosts attached to the home network (using for example the Dynamic Host Configuration Protocol DHCP). The allocated set of internet addresses comprise a common prefix portion which identifies the home network, whilst a suffix portion identifies the destination host. When a datagram is received by a home network, a router (R) of the home network polls the attached hosts to determine which host corresponds to the internet address conveyed with the datagram. The datagram is then forwarded by the router to the identified host.

With the recent rapid advances in mobile communication technology, and in particular of wireless technologies, there has come a desire to gain internet access from mobile hosts or terminals, for example a laptop computer coupled to a cellular telephone. At present, this is available via certain digital telephone networks (e.g. GSM). As with conventional fixed line internet access, a mobile host may have a fixedly or dynamically assigned internet address, allocated by a service provider who is usually the cellular telephone network operator. In the case of mobile internet access, a communication channel between the mobile host and the network is reserved for the duration of the call. Internet data destined for the mobile host is received by the network and is sent to the host over the reserved channel.

This system works satisfactorily whilst a mobile host remains within one homogeneous network. However, it does not provide for "roaming" between different types of networks or between networks operated by different operators. When a mobile host "de-registers" with one network and registers with a new network, there is no mechanism for forwarding internet datagrams, addressed to the old network, to the new network as the communication channel between the mobile host and the old network no longer exists. It is therefore necessary to open a new communication channel between the mobile host and the new network. All datagrams addressed to the old network and not yet received by the mobile host are lost as a result of this channel change.

The desire for roaming is likely to increase in the near future as the provision of corporate wireless LANs becomes commonplace. A corporate user will have the opportunity to make wireless voice and data calls from a mobile terminal via the corporate LAN whilst he is inside the coverage area of that LAN. When the user leaves that area, he will then be able to connect to a digital cellular telephone network. In addition, so-called "hot-spot" LANs are likely to be provided in areas where high data capacity is required, e.g. airports, shopping centres. In all probability, hot-spot LANs will be operated by the cellular network operators although they may of course be operated by the property owners themselves.

A mobile internet access protocol which provides for roaming is currently being standardised by the Internet Engineering Task Force (IETF). This protocol is known as RFC2002. A mobile internet protocol is also described in EP556012. These protocols make use of a "home agent", located in a mobile host's home network, to keep track of the host when it leaves the home network. A mobile host is fixedly allocated an internet address corresponding to the home network.

When a mobile host is registered to its home network, the functionality of the network's home agent is off for that host (i.e. the host is "deregistered" with the home agent) so that the home agent does not alter the flow of datagrams from the internet to the network's router and the mobile host (as indicated by reference numeral 1 in FIG. 2). When the mobile host leaves its home network and contacts a foreign network (FN), the host is registered with a foreign agent (FA) of that network. The foreign agent then transmits to the mobile host an internet address of the foreign agent, and the mobile host in turn transmits the received internet address to the home network's home agent, together with a registration instruction. The home agent registers the new status of the mobile host and records the newly allocated internet address as a "care-of-address" for the host. Whenever the mobile host registers with a new foreign network, a new care-of-address is sent to the home network's home agent to replace the previously registered care-of-address.

It will be appreciated that, as a mobile host has a fixed internet address allocated to it, datagrams destined for the host will always be sent to the home network. If a mobile host has an active internet connection when it passes from its home network to a foreign network, and a datagram destined for the host subsequently arrives at the home network, the home agent determines that the mobile host is registered with a foreign agent and forwards the datagrams to the registered care-of-address. A communication channel will have been reserved between the mobile host and the foreign agent, and the redirected datagram can be sent to the mobile host over this channel. Similarly, if a mobile host initiates a new internet access when registered with a foreign network, the host continues to use its allocated internet address. The home agent has already received the care-of-address and can again forward datagrams destined for the mobile host to the foreign agent for transfer to the host.

In some cases, the foreign network may dynamically assign an internet address to a visiting mobile host, e.g. if the foreign network does not have a foreign agent. This address is sent to the mobile host which in turn sends it to the home network's home agent as a care-of-address. Rather than just merely redirecting datagrams to the care-of-address, the home agent actually replaces the old internet address contained in the datagram with the co-located care-of-address before retransmitting the datagram. This particular form of care-of-address which identifies the mobile host as the end point for the redirected datagrams, rather than a foreign agent, is known as a "co-located care-of-address". It is noted however, that when the mobile host is accessing the internet via the foreign network, it still uses its fixedly allocated internet address. It will therefore be appreciated that regardless of whether the home agent receives a care-of-address or a co-located care-of-address all datagrams directed to a mobile host pass through the home network's home agent (as indicated by reference numeral 2 in FIG. 2).

Where a cellular telephone operator operates a number of different networks, e.g. GSM and hot-spot LANs, in order to bill a subscriber using the roaming facility, the operator must collect details, e.g. call duration, location, from the foreign agents of each of the operated networks. This is necessary because internet data is not routed through any central facility of the operator but is rather routed through the home network's home agent to which the operator does not have access. Collecting this information for billing purposes is complex and time consuming.

SUMMARY OF THE INVENTION

It is an object of the present invention to obviate or at least mitigate the above noted problem of the currently proposed mobile internet protocol.

This and other objects are achieved by providing a home agent in a foreign network, in addition to the home agent in the home network.

According to a first aspect of the present invention there is provided a method of enabling roaming of a mobile host from a first to a second internet access network each of which has a home agent for routing internet datagrams between networks, the method comprising:

de-registering the mobile host from said first network and registering it with said second network;

assigning to the mobile host a new internet address in said second network;

transmitting said new internet address to the first network's home agent, and registering that transmitted address at the first network's home agent as a care-of-address or co-located care-of-address for the mobile host, wherein datagrams addressed to said new internet address are sent directly to the mobile host via the second network's home agent, and datagrams addressed to an internet address previously assigned to the mobile host in said first network are forwarded, using said registered care-of-address or co-located care-of-address, from that network's home agent to the mobile host via the second network's home agent.

Preferably, the method set out above is performed in reverse when the mobile host roams from the second network to the first network, so that datagrams sent to an old address in the second network are forwarded to the mobile host in the first network.

The present invention may be applied to provide mobility for a mobile host between a corporate local area network (LAN) or wide area network (WAN), and a cellular telephone network. The corporate LAN or WAN may be a fixed line network or a wireless network. The cellular telephone network may comprise, for example, a GSM (Global System for Mobile Communications) network. The cellular telephone network may alternatively, or in addition, comprise one or more subnetworks, i.e. wireless LANs or WANs (known as "hot-spot" LANs or WANs). As the cellular telephone network has a single home agent through which all internet datagrams are routed when the mobile host is registered to the cellular network, the network operator can collect all internet call data for a mobile host from its own home agent. There is thus no need to obtain such information from the home agent of the corporate network or from a number of foreign agents associated with the different GSM and hot-spot LAN/WAN networks. When the mobile host is registered with the corporate network however, all new internet connections are made using the corporate network's home agent as home internet address. This typically presents a more cost effective option for the subscriber.

An advantage of embodiments of the present invention is that the transmission route from a source host to the destination mobile host may be shortened when the mobile host is visiting a foreign network, as compared to prior proposals. This is because datagrams do not necessarily have to be routed via the mobile host's home network but instead can be sent directly to the foreign network.

It will be appreciated that the mobile host comprises an access point to the internet. The user interface may be a personal computer, e.g. a laptop computer, coupled to the access point. In order to allow the user interface to connect to the access point, the user interface may be connected to a cellular telephone. Alternatively, the user interface may be a computer or personal digital assistant incorporating a cellular telephone.

The new internet address in the second network assigned to the mobile host may be an internet address allocated to the second network's home agent. In this case the address is a care-of-address. Alternatively, the internet address may be an address dynamically assigned to the mobile host, in which case the address is a co-located care-of-address.

According to a second aspect of the present invention there is provided apparatus for enabling roaming of a mobile host from a first to a second internet access network, the apparatus comprising:

second network control means for registering the mobile host to the second network and for transmitting to the mobile host a new internet address in the second network to replace any internet address previously allocated to the host;

transmission means for transmitting said new internet address from the mobile host to the home agent in the first network;

first network control means for registering said transmitted address at the first network's home agent as a care-of-address or colocated care-of-address for the mobile host; and datagram routing means in said first network for forwarding datagrams received at said first network and destined for the mobile host to the mobile host via the second network's home agent.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
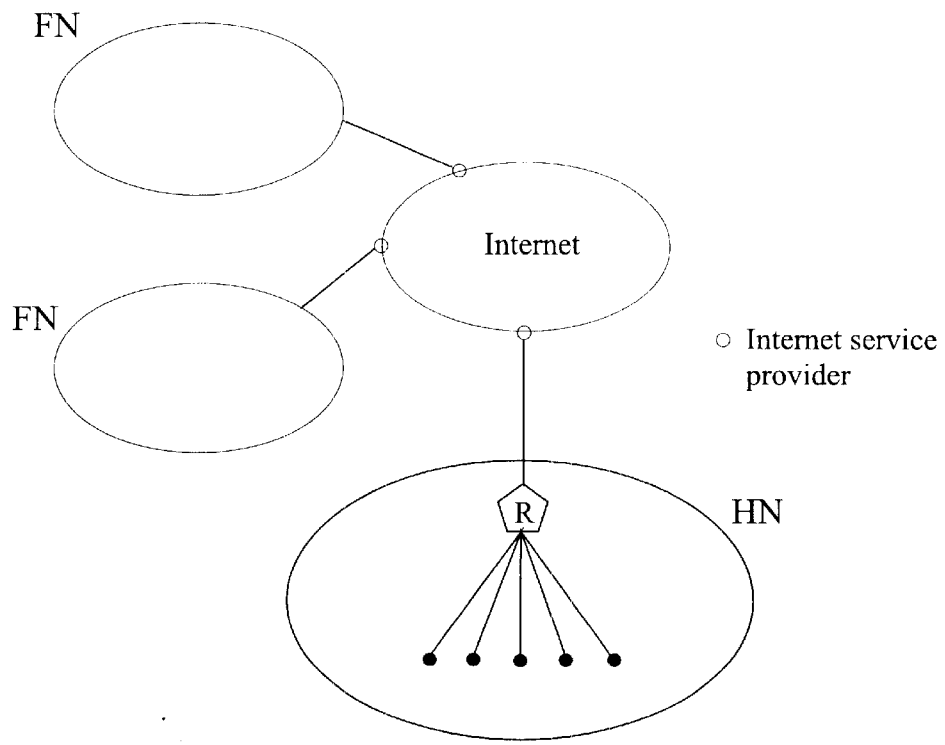
FIG. 1 illustrates schematically a fixed host internet access system according to the prior art.
Figure 2:
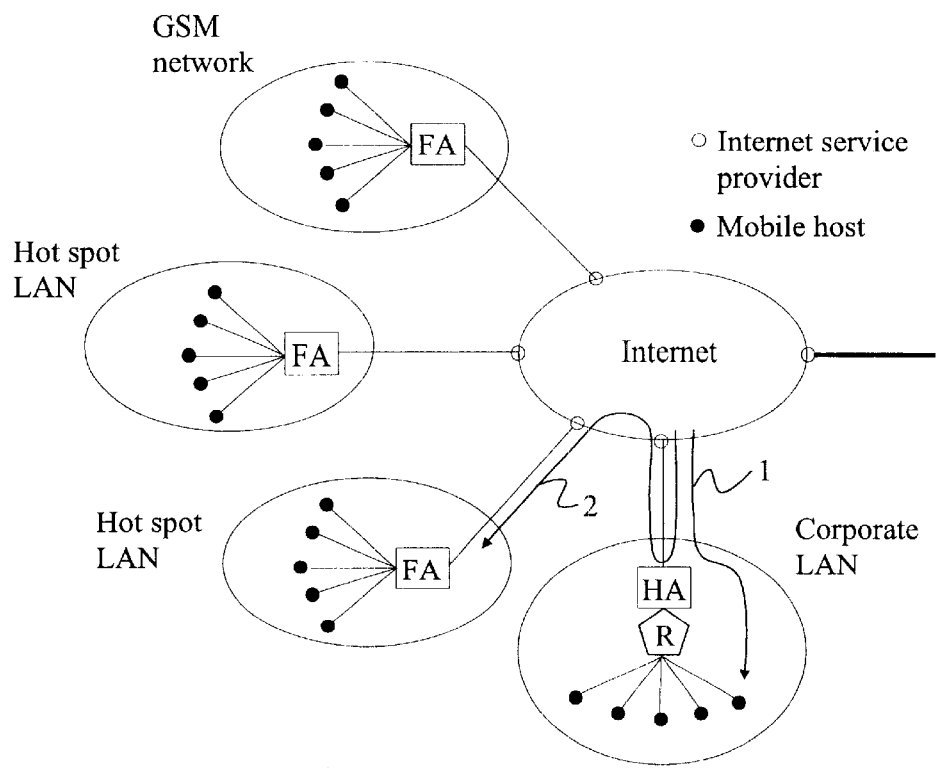
FIG. 2 illustrates schematically a mobile host internet access system according to the prior art.

As has already been described, FIGS. 1 and 2 illustrate respectively, conventional fixed host and mobile host internet access systems.

Figure 3:
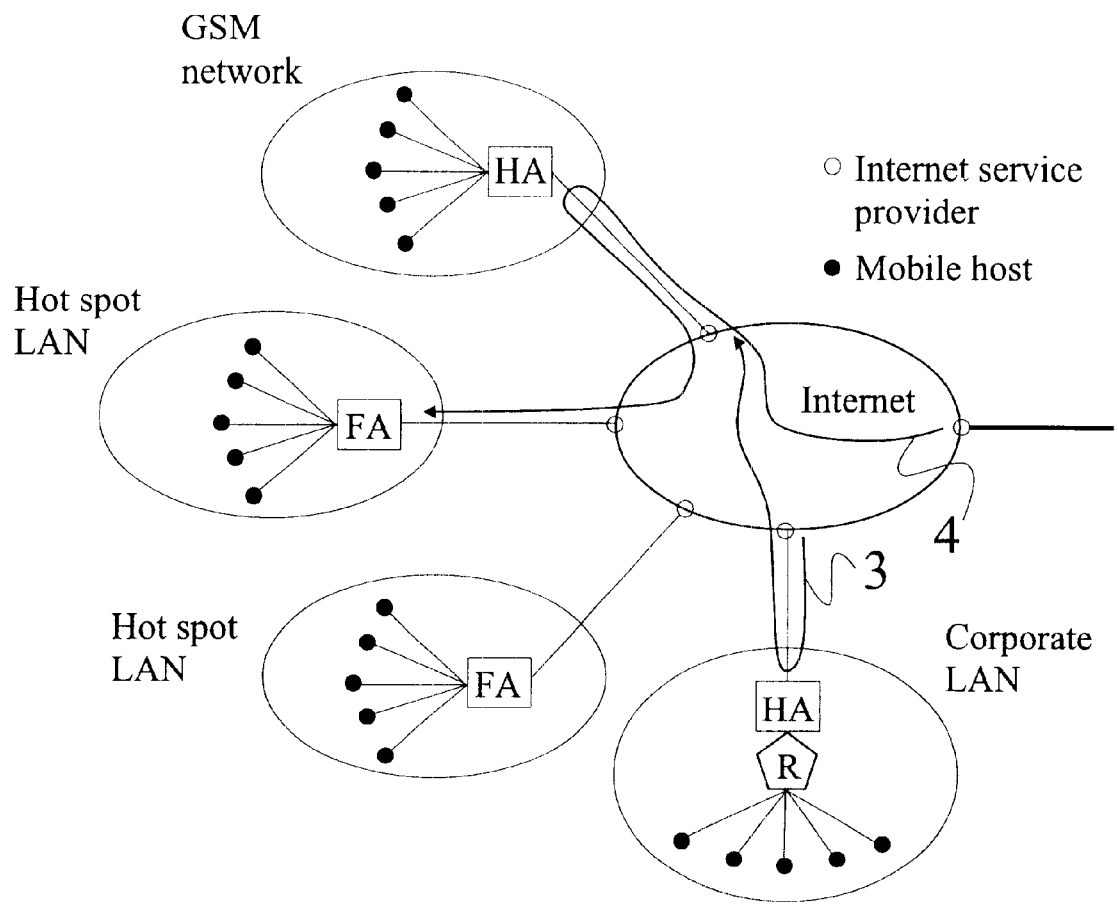
FIG. 3 illustrates schematically a mobile host internet access system according to an embodiment of the present invention.

With reference to FIG. 3, there is illustrated a wireless corporate LAN in which a number of mobile hosts are coupled to a common network home agent (HA) via a router (R). The corporate LAN is connected via one or more fixed land lines to an internet service provider which provides connectivity and routing functions between the corporate LAN and the internet.

Whilst a mobile host is registered to the corporate LAN, the host either has a fixed internet address or an address dynamically assigned by the router. In either case, the host's address is one of those assigned to the corporate LAN. The home address is attached to datagrams sent from the mobile host to the internet and enables return datagrams to be correctly delivered back to the home agent at the corporate LAN.

FIG. 3 also illustrates a GSM cellular telephone network together with two so-called hot spot LANs. The GSM network provides cellular telephone services to subscribers over a wide geographical area whilst the hot spot LANs provide relatively high capacity telephone services over a smaller, local area. The geographical coverage of the GSM network may overlap with that of the hot spot LANs. In the present example, the GSM network and the two hot spot LANs are operated by the same operator which bills subscribers using any or all of the operated networks by way of a single bill.

If a mobile host subscribing to the corporate LAN and to the cellular telephone network leaves the coverage area of the corporate LAN and enters that of the cellular telephone network (either GSM or hot spot LAN), the host will deregister with the former whilst registering with the latter. Upon registration with the telephone network, the network assigns and transmits to the mobile host a new internet address in that network. This new address is either one of a number of addresses allocated to the GSM network and defining the home agent as the end point, or is dynamically assigned to the mobile host (e.g. using DHCP) to define the mobile host as the end point. In either case, the new address replaces the internet address allocated to the host when it was registered to the corporate LAN. Datagrams destined for the mobile host, and initiated via the cellular telephone network, are now sent directly to the cellular telephone network (see reference numeral 4 in FIG. 3). This contrasts with previously proposed roaming protocols where the host retained the internet address assigned by the corporate LAN (i.e. the home network) and used an address assigned by the foreign network only as a care-of-address.

However, whilst new datagrams will be directed to the mobile host at the new internet address, some datagrams initiated using the old address in the corporate LAN may still be in transit. A registration message is therefore transmitted from the mobile host to the corporate LAN's home agent to register the mobile host's new internet address with the home agent (either as a care-of-address or as a co-located care-of-address). If the corporate LAN subsequently receives datagrams destined for the mobile host, the corporate LAN's home agent determines that the mobile host is now registered with a foreign network and it redirects the datagrams to the care-of-address or colocated care-of-address now registered for the mobile host. The GSM network's home agent receives these forwarded datagrams and redirects them to the mobile host, either directly or via a foreign agent in a hot spot LAN. This redirection route is indicated in FIG. 3 by reference numeral 3.

When the mobile host moves between different "subnetworks" of the cellular telephone network, e.g. from the GSM network to a hot spot LAN, there is no need to update the care-of-address or co-located care-of-address at the corporate network's home agent. It is only necessary to update the location details of the mobile host at the GSM network's home agent.

On the mobile host returning from the cellular telephone network to the corporate LAN, the process described above is repeated in reverse. The mobile host deregisters to the cellular telephone network and registers with the corporate LAN. The mobile host sends its new internet address in the corporate LAN to the home agent of the GSM network as a care-of-address (or co-located care-of-address) for the mobile host.

When the cellular telephone operator wishes to bill a subscriber for using its networks, all the necessary information is held in the GSM network's home agent. However, the subscriber remains able to avoid using the cellular telephone network, and therefore minimise his costs, when he is connected to the corporate LAN (except of course when receiving datagrams directed to an old cellular telephone network home address).

It will be appreciated that the cellular telephone network described above may comprise more or fewer than three subnetworks. It will also be appreciated that the corporate network may comprise a number of different subnetworks, all sharing a common home agent. The invention may also be applied to more than two networks, e.g. to a corporate network and to two cellular telephone networks operated by different operators.

It will be appreciated by a person of skill in the art that modifications may be made to the above described embodiment without departing from the scope of the present invention.

What is claimed is:

1. A method of enabling roaming of a mobile host from a first to a second internet access network each of which has a home agent for the mobile host for routing internet datagrams between networks, the method comprising:

de-registering the mobile host from said first network and registering it with said second network;

assigning to the mobile host a new internet address in said second network;

transmitting said new internet address to the first network's home agent, and registering that transmitted address at the first network's home agent as a care-of-address or co-located care-of-address for the mobile host, wherein datagrams addressed to said new internet address are sent directly to the mobile host via the second network's home agent, and datagrams addressed to an internet address previously assigned to the mobile host in said first network are forwarded, using said registered care-of-address or co-located care-of-address, from that network's home agent to the mobile host via the second network's home agent.

2. A method according to claim 1, wherein said first and second networks are one of a corporate local area network (LAN) or wide area network (WAN), and a cellular telephone network.

3. A method according to claim 2, wherein the corporate LAN or WAN is one of a fixed line network or a wireless network.

4. A method according to claim 2, wherein the cellular telephone network comprises a GSM (Global System for Mobile Communications) network.

5. A method according to claim 2, wherein the cellular telephone network comprises a plurality of subnetworks.

6. A method according to claim 5, wherein one or more of said subnetworks is/are wireless LANs or WANs.

7. The method of claim 1 wherein the first network and the second network are different types.

8. The method of claim 1 wherein the mobile host is subscribed to both the first network and the second network.

9. Apparatus for enabling roaming of a mobile host from a first to a second internet access network, the apparatus comprising:

second network control means for registering the mobile host to the second network and for transmitting to the mobile host a new internet address in the second network to replace any internet address previously allocated to the host;

transmission means for transmitting said new internet address from the mobile host to the home agent in the first network;

first network control means for registering said transmitted address at the first network's home agent as a care-of-address or co-located care-of-address for the mobile host; and datagram routing means in said first network for forwarding datagrams received at said first network and destined for the mobile host to the mobile host via the second network's home agent.

10. Apparatus according to claim 9, wherein at least one said first and second networks is a wireless telephone network and said mobile host is a wireless terminal.

11. A method of communicating datagrams to a mobile host moving between at least a first network and at least a second network, the method comprising the steps of:

providing a first home agent in the first network for the mobile host;

providing a second home agent in the second network for the mobile host;

de-registering the mobile host from the first network and registering the mobile host with the second network, wherein the second network replaces a destination host address currently allocated to the mobile host with a new internet address, wherein datagrams destined for the mobile host initiated via the second network are transmitted directly to the mobile host via the home agent of the second network.

12. The method of claim 11 wherein the new address defines the second home agent as an end point for the datagram.

13. The method of claim 11 wherein the new address defines the mobile host as an end point for the datagram.

14. The method of claim 11 further comprising the steps of transmitting a registration message from the mobile host to the first network to register the new address with the first network as a new destination host for the mobile host, and wherein datagrams received by the first network for the mobile host are redirected to the new address.

* * * * *